(12) United States Patent
Park

(10) Patent No.: US 10,852,960 B2
(45) Date of Patent: Dec. 1, 2020

(54) CONTROLLER, OPERATING METHOD THEREOF AND MEMORY SYSTEM FOR DETERMINING A LOW VOLTAGE DETECTION FAIL

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 171 days.

(21) Appl. No.: 16/113,640

(22) Filed: Aug. 27, 2018

(65) Prior Publication Data

US 2019/0235770 A1    Aug. 1, 2019

(30) Foreign Application Priority Data

Feb. 1, 2018  (KR) .................. 10-2018-0012661

(51) Int. Cl.
*G06F 3/06* (2006.01)
*G06F 1/28* (2006.01)
*G06F 1/30* (2006.01)

(52) U.S. Cl.
CPC .............. *G06F 3/0619* (2013.01); *G06F 1/28* (2013.01); *G06F 1/305* (2013.01); *G06F 3/0658* (2013.01); *G06F 3/0679* (2013.01)

(58) Field of Classification Search
CPC .... G06F 3/0619; G06F 3/0658; G06F 3/0679; G06F 1/28; G06F 1/305
See application file for complete search history.

(56) References Cited

U.S. PATENT DOCUMENTS

2015/0248920 A1*  9/2015  Miyamoto .............. G06F 1/305
                                                              369/53.42

FOREIGN PATENT DOCUMENTS

KR    1020120139070    12/2012
KR    1020140079914    6/2014

\* cited by examiner

*Primary Examiner* — Aracelis Ruiz
(74) *Attorney, Agent, or Firm* — IP & T Group LLP

(57) ABSTRACT

A controller includes a power management unit suitable for providing and monitoring an operational voltage; a counter suitable for measuring a Low Voltage Detection (LVD) time, in which the operational voltage stays within an LVD range; a processor suitable for controlling a memory device to store write data with the LVD time corresponding to the write data stored into the memory device; and an LVD controller suitable for determining, during a recovery operation after occurrence of an LVD fail, a reason for a system fail as the LVD fail based on the LVD times and suitable for performing a debugging operation on a target data, which has the LVD time longer than a predetermined threshold time.

19 Claims, 10 Drawing Sheets

CONTROLLER, OPERATING METHOD THEREOF AND MEMORY SYSTEM FOR DETERMINING A LOW VOLTAGE DETECTION FAIL

CROSS-REFERENCE TO RELATED APPLICATIONS

The present application claims priority under 35 U.S.C. § 119(a) to Korean Patent Application No. 10-2018-0012661 filed on Feb. 1, 2018, the disclosure of which is incorporated herein by reference in its entirety.

BACKGROUND

1. Field

Various embodiments of the present invention generally relate to a controller and a memory system. Particularly, the embodiments relate to a controller capable of efficiently managing data, and an operating method thereof, and a memory system including the controller.

2. Description of the Related Art

The computing environment paradigm has been shifting towards ubiquitous computing, which enables computer systems to be used anytime and anywhere. As a result, the demand for portable electronic devices such as mobile phones, digital cameras and laptop computers has been soaring. Those electronic devices generally include a memory system using a memory device as a data storage device. The data storage device may be used as a main memory unit or an auxiliary memory unit of a portable electronic device.

Since the data storage device uses a memory device that does not have a mechanical driving unit (e.g., a mechanical arm with a read/write head) as compared with a hard disk device, it may have excellent stability and durability, high information access speed, and low power consumption. Non-limiting examples of the data storage device having such advantages include Universal Serial Bus (USB) memory devices, memory cards of diverse interfaces, Solid-State Drives (SSD) and the like.

SUMMARY

Various embodiments of the invention are directed to a controller and a memory system capable of quickly curing a system fail generated by Low Voltage Drop.

In accordance with an embodiment of the present invention, a controller may include: a power management unit suitable for providing and monitoring an operational voltage; a counter suitable for measuring a Low Voltage Detection (LVD) time, in which the operational voltage stays within an LVD range; a processor suitable for controlling a memory device to store write data with the LVD time corresponding to the write data stored into the memory device; and an LVD controller suitable for determining, during a recovery operation after occurrence of an LVD fail, a reason for a system fail as the LVD fail based on the LVD times and suitable for performing a debugging operation on a target data, which has the LVD time longer than a predetermined threshold time.

In accordance with an embodiment of the present invention, an operating method of controller may include: monitoring, by a power management unit, an operational voltage; measuring, by a counter, a Low Voltage Detection (LVD) time, in which the operational voltage stays within an LVD range; controlling, by a processor, a memory device to store write data with the LVD time corresponding to the write data stored into the memory device; determining, by a LVD controller, a reason for a system fail as a LVD fail based on the LVD times during a recovery operation after occurrence of the LVD fail; and performing, by the LVD controller, a debugging operation on a target data, which has the LVD time longer than a predetermined threshold time.

In accordance with an embodiment of the present invention, a memory system may include a memory device; and a controller suitable for controlling the memory device, wherein the controller includes: a power management unit suitable for providing and monitoring an operational voltage; a counter suitable for measuring a Low Voltage Detection (LVD) time, in which the operational voltage stays within an LVD range; a processor suitable for controlling the memory device to store write data with the LVD time corresponding to the write data stored into the memory device; and an LVD controller suitable for determining, during a recovery operation after occurrence of an LVD fail, a reason for a system fail as the LVD fail based on the LVD times and suitable for performing a debugging operation on a target data, which has the LVD time longer than a predetermined threshold time.

In accordance with an embodiment of the present invention, a memory system may include a memory device suitable for storing data; and a controller suitable for using an operational voltage to program the data in the memory device, wherein the controller is suitable for measuring a Low Voltage Detection (LVD) time that the operational voltage is within an LVD range and storing the data with the LVD time associated with the data in the memory device, wherein the controller performs at least one of a first operation of determining a system fail based on the LVD times during a recovery operation and a second operation of performing a debugging operation to a target data associated with the LVD time longer than a threshold time.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
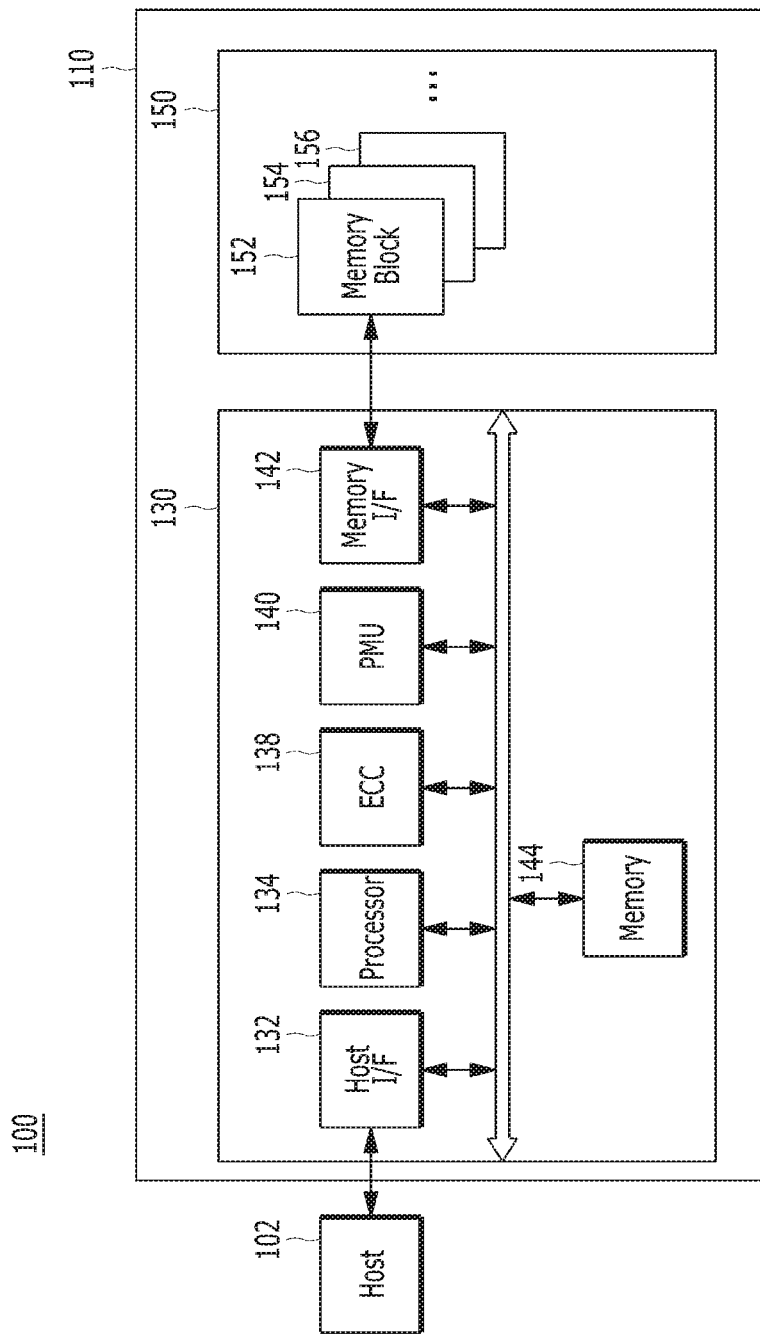
FIG. 1 is a block diagram illustrating a data processing system including a memory system in accordance with an embodiment of the present disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing particular embodiments only and is not intended to be limiting of the invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

Non-limiting examples of the host 102 may include portable electronic devices such as a mobile phone, an MP3 player, and a laptop computer or may include electronic devices such as a desktop computer, a game player, a TV, a projector and the like.

By way of example and not limitation, the memory system 110 may operate or perform a specific function or operation in response to a request from the host 102. Particularly, the memory system 110 may store data to be accessed by the host 102. The memory system 110 may work as a main memory system or an auxiliary memory system of the host 102. The memory system 110 may be implemented with any one of various types of storage devices, which may be electrically coupled with the host 102 under a protocol of a host interface. Non-limiting examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices establishing or constituting a home network, one of various electronic devices establishing or constituting a computer network, one of various electronic devices configuring a telematics network, a radio frequency identification (RFID) device, or one of various components configuring a computing system.

The memory device 150 may be a nonvolatile memory device and may retain data stored therein even when power is not supplied. The memory device 150 may store data provided from the host 102 through a write operation, and provide data stored therein to the host 102 through a read operation. The memory device 150 may include a plurality of memory blocks 152, 154, 156, . . . (hereinafter, referred to as "memory blocks 152 to 156"). Each of the memory blocks 152 to 156 may include a plurality of pages. Each of the plurality of pages may include a plurality of memory cells to which a word lines (WL) is electrically coupled.

The controller 130 may control overall operations of the memory device 150, such as read, write, program and erase operations. By way of example but not limitation, the controller 130 of the memory system 110 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) 132, a processor 134, an error correction code (ECC) component 138, a power management unit (PMU) 140, a memory device controller such as a memory interface (I/F) 142, and a memory 144. Each of components may be electrically coupled to, or engaged with, each other via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC component 138 may detect and correct errors in the data read from the memory device 150 during the read operation. When the number of the error bits is greater than or equal to a threshold number of correctable error bits, the ECC component 138 may not correct error bits, but may instead output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. However, the present disclosure is not limited thereto. That is, the ECC component 138 may include all or some of circuits, modules, systems or devices configured to perform the error correction operation based on at least one of the above described codes.

The PMU 140 may provide and manage power supplied to the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory of the memory system 110 and the controller 130. The memory 144 may store temporary or transactional data for operating or driving the memory system 110 and the controller 130. The controller 130 may control the memory device 150 in response to a request provided from the host 102. The controller 130 may deliver data read from the memory device 150 into the host 102. The controller 130 may store data entered through the host 102 within the memory device 150. The memory 144 may be used to store data required for the controller 130 and the memory device 150 to perform these operations.

The memory 144 may be implemented with a volatile memory. For example, the memory 144 may be implemented with a static random access memory (SRAM) or a dynamic random access memory (DRAM). Although FIG. 1 exemplifies the memory 144 disposed within the controller 130, the disclosure is not limited thereto. That is, the memory 144 may be located inside or outside the controller 130. For instance, the memory 144 may be embodied by an external volatile memory having a memory interface transferring data and/or signals transferred between the memory 144 and the controller 130.

The processor 134 may control the overall operations of the memory system 110. The processor 134 may use, drive or execute a firmware to control the overall operations of the memory system 110. The firmware may be referred to as a flash translation layer (FTL).

The FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 based on the map data. The memory device 150 may perform an operation like a general device because of the address mapping operation. When the controller 130 updates data of a particular page, the controller 130 may use an address mapping operation based on the map data to program new data on another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134. The management unit may perform bad block management of the memory device 150. The management unit may find bad memory blocks included in the memory device 150, which are in unsatisfactory condition for further use. The management unit may perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be moved and programmed into a new memory block. The bad blocks may seriously aggravate the utilization efficiency of the memory device 150 having a 3D stack structure and the reliability of the memory system 100, and thus reliable bad block management is required.

Figure 2:
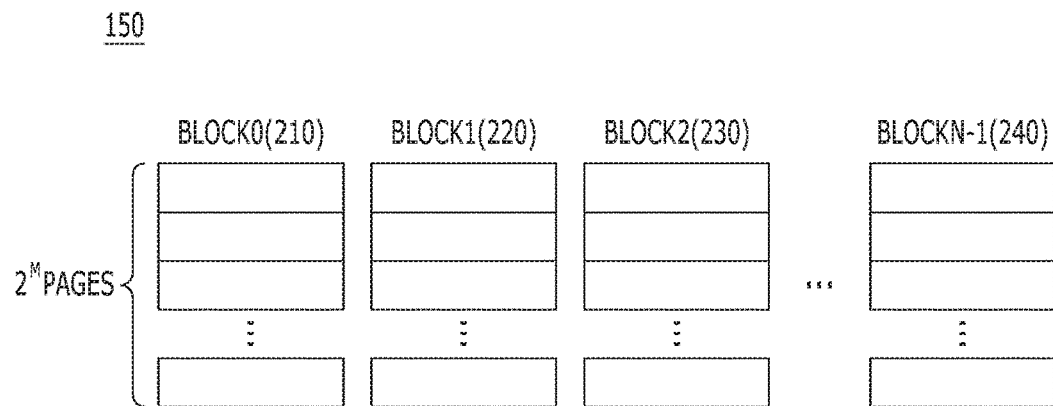
FIG. 2 is a schematic diagram illustrating an exemplary configuration of a memory device of the memory system shown in FIG. 1.

FIG. 2 is a schematic diagram illustrating the memory device 150 of FIG. 1.

Referring to FIG. 2, the memory device 150 may include the plurality of memory blocks BLOCK0 (210) to BLOCKN-1 (240), and each of the blocks BLOCK0 (210) to BLOCKN-1 (240) may include a plurality of pages, for example, $2^M$ pages, the number of which may vary according to circuit design. The memory device 150 may include a plurality of memory blocks, such as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. For example, an MLC memory block including a plurality of pages which are implemented with memory cells that are individually capable of storing 3-bit data may be defined as a triple level cell (TLC) memory block.

Figure 3:
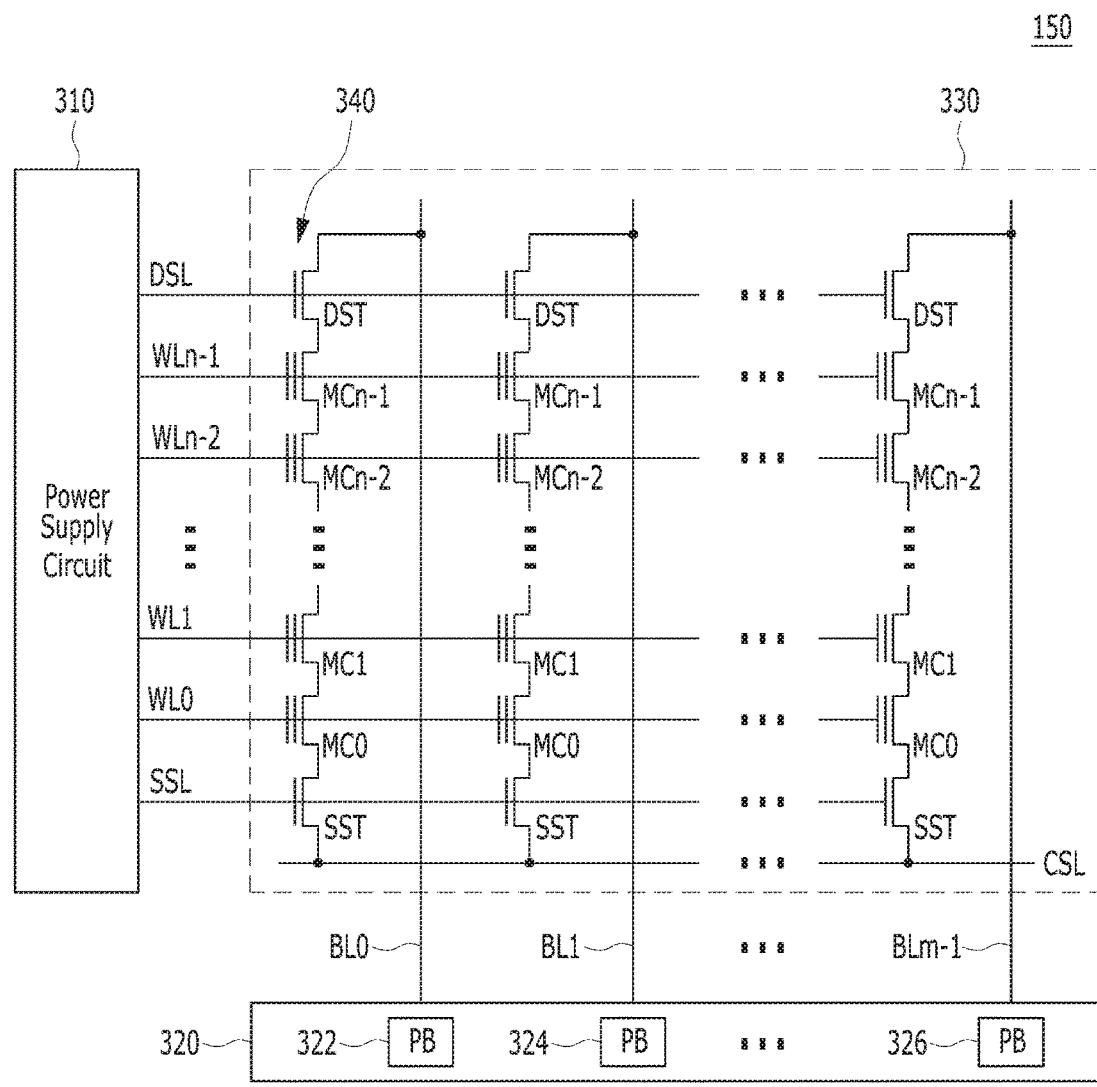
FIG. 3 is a circuit diagram illustrating an exemplary configuration of a memory cell array of a memory block in the memory device shown in FIG. 2.

FIG. 3 is a circuit diagram illustrating a memory block 330 in the memory device 150 of FIG. 1. The memory block 330 may correspond to any of the plurality of memory blocks 152 to 156 shown in FIG. 1.

Referring to FIG. 3, the memory block 330 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured as single level cells (SLC), each of which may store 1 bit of information, or as multi-level cells (MLC), each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line. A plurality of world lines WL0 to WLn-1 may be coupled in series between the select source line SSL and the drain source line DSL.

While FIG. 3 only shows, by way of example and not limitation, that the memory block 330 is constituted with NAND flash memory cells, it is to be noted that the memory block 330 of the memory device 150 according to the embodiment is not limited to a NAND flash memory. The memory block 330 may be realized by a NOR flash memory, a hybrid flash memory in which at least two kinds of memory cells are combined, or a one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 in the memory device 150 may generate different word line voltages such as a program voltage, a read voltage and a pass voltage, which may be selectively supplied to each of word lines according to an operation mode and voltages to be supplied to bulks. The bulks may include well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver in response to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and supply into bit lines a voltage or a current determined according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
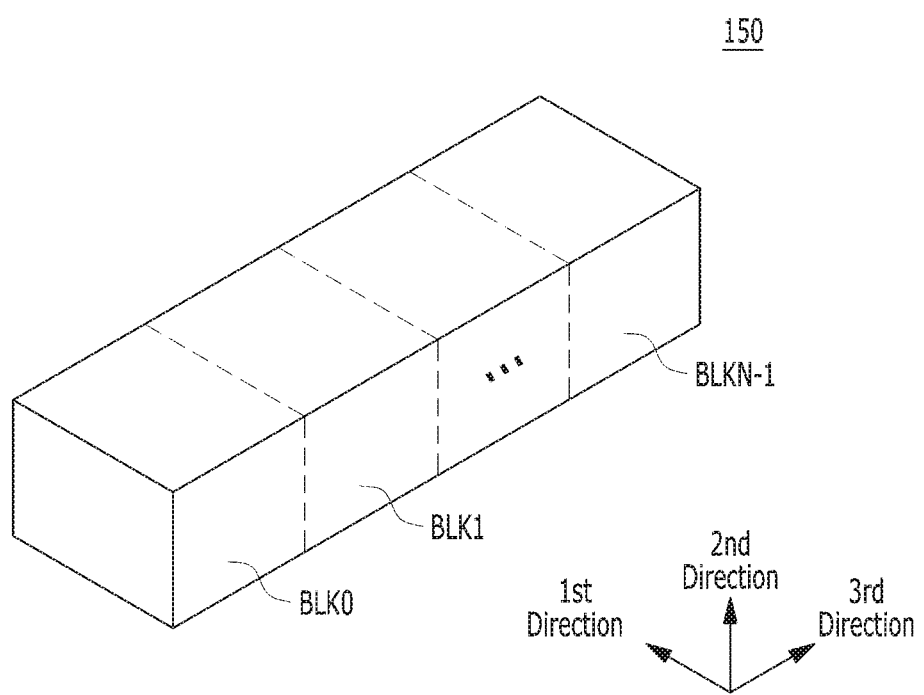
FIG. 4 is a schematic diagram illustrating an exemplary three-dimensional structure of the memory device shown in FIG. 2.

FIG. 4 is a schematic diagram illustrating a three-dimensional (3D) structure of the memory device 150.

The memory device 150 may be embodied by a two-dimensional 2D or a three-dimensional (3D) memory device. Specifically, as illustrated in FIG. 4, the memory device 150 may be embodied in a nonvolatile memory device having a 3D stack structure. When the memory device 150 has a 3D structure, the memory device 150 may include a plurality of memory blocks BLK0 to BLKN-1 each having a 3D structure (or a vertical structure).

As technology improves, more semiconductor apparatuses operate with a lower level of operational voltage. A semiconductor apparatus operating with a lower operational voltage has an advantage in terms of power consumption. For mobile devices, an electronic apparatus running on a limited power supply has an issue of reducing power consumption. As a result, the demand for a semiconductor apparatus operating with a lower operational voltage has increased. A semiconductor apparatus operating with a lower operational voltage is sensitive to voltage level changes of a signal provided externally. For example, when a voltage level of a signal entered from an external device, transmission speed of data may be changed. As the voltage level of a signal entered from an external becomes lower, a possibility that a controller recognizes or receives correct data becomes lower.

To secure a reliable and stable operation of a semiconductor apparatus, the semiconductor apparatus may detect when the supplied voltage drops below a minimum allowable level, which is referred to as Low Voltage Detection (LVD). When LVD is detected, a semiconductor apparatus may perform an LVD process operation to avoid a system fail (hereinafter, referred to as "LVD fail") due to the LVD. When an operational voltage becomes lower than an LVD threshold voltage level, a power management unit, e.g., the PMU 140 of FIG. 1, may detect a time duration in which the operational voltage stays lower than the LVD threshold voltage level. When the time duration in which the operational voltage stays lower than the LVD threshold voltage level becomes greater than a predetermined threshold time, the semiconductor apparatus may perform an LVD process operation. The LVD process operation may include an operation of storing in a memory device information for a debugging operation to be performed during a recovery operation after the LVD fail. However, when the LVD fail occurs again during the LVD process operation or when the LVD fail occurs within a shorter time than a time duration in which the LVD is detected, the LVD process operation cannot be performed. As a result, it may be very difficult for the semiconductor apparatus performing a recovery operation on the failed system to determine the cause of the system failure (i.e., whether system fail occurred due to an LVD fail).

In accordance with an embodiment of the present invention, a controller (for example, the controller 130 of FIG. 1) capable of determining that the LVD fail has occurred even under the situation described above and an operating method of the controller 130 is provided.

Figure 5:
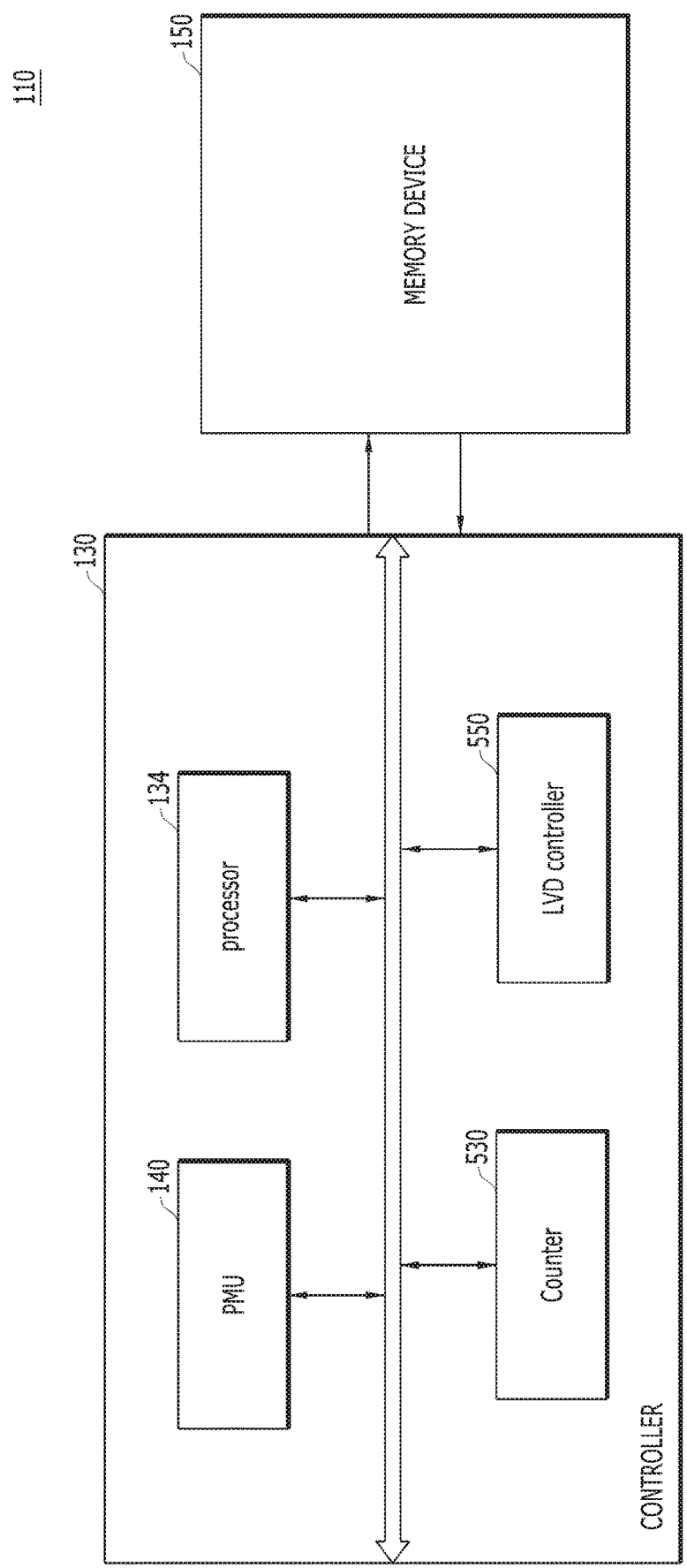
FIG. 5 is a block diagram schematically illustrating a memory system in accordance with an embodiment of the present disclosure.

FIG. 5 is a block diagram schematically illustrating a memory system 110 in accordance with an embodiment of the present invention. The memory system 110 may include the controller 130 and the memory device 150.

Referring to FIG. 5, the controller 130 may include the processor 134, the power management unit (PMU) 140, a counter 530, and an LVD controller 550.

Referring to FIGS. 1 and 5, the PMU 140 may provide an operational voltage to the controller 130 and manage the operational voltage. Also, the PMU 140 may monitor the operational voltage of the controller 130. Further, the PMU 140 may monitor the operational voltage of the controller 130 even when the operational voltage of the controller 130 is in an LVD range between a cut-off voltage and an LVD threshold voltage. The cut-off voltage may be lower than a normal operational voltage of the controller 130. When an operational voltage lower than the cut-off voltage is provided to the controller 130, the controller 130 may not operate. The LVD threshold voltage may be greater than the cut-off voltage but may not be sufficient for the controller 130 to normally operate. When the operational voltage of the controller 130 is within the LVD range, the controller 130 may operate but the operation of the controller 130 may have low reliability due to the low level of the operational voltage of the controller 130.

The counter 530 may detect a time duration (hereinafter, referred to as an "LVD time"), in which the operational voltage of the controller 130 stays within the LVD range. When the operational voltage of the controller 130 falls in the LVD range during an operation for processing a first write data and the LVD time is 1 microsecond (μs), the counter 530 may measure a value of one (1) corresponding to the first write data. When the operational voltage of the controller 130 falls in a normal range other than the LVD range during an operation for processing a second write data, the counter 530 may measure a value of zero (0) corresponding to the second write data. Although FIG. 5 shows the LVD controller 550 as a separate component from the PMU 140, the present invention is not limited thereto. That is, the LVD controller 550 may be included in the PMU 140.

The LVD controller 550 may perform the LVD process as described above. For example, the LVD controller 550 may store in advance information for a debugging operation into the memory device 150 in preparation of a system fail, which may occur due to the low reliability of the first write data processed with the operational voltage of the controller 130 within the LVD range. Although FIG. 5 shows the LVD controller 550 as a separate component from the processor 134, the present invention is not limited thereto. That is, the LVD controller 550 may be included in the processor 134.

When an LVD fail occurs, the LVD controller 550 may determine that the LVD fail occurred, as a reason for a system fail, based on the LVD times respectively corresponding to each of the data stored in the memory device 150 when the LVD fail occurs. The LVD controller 550 may determine the reason for the system fail as the LVD fail based on the LVD times starting from a most recently accessed page. For example, the LVD controller 550 may determine the reason for the system fail as the LVD fail based on the LVD times starting from a most recently read or written page.

Then, the LVD controller 550 may perform a debugging operation to a target data, which has the LVD time longer than a predetermined threshold time. Since the information for the debugging operation to the target data is not stored in the memory device 150, the LVD controller 550 may perform the debugging operation to the target data based on system information and electrical characteristic information.

Referring to FIGS. 1 and 5, the processor 134 may control the memory device 150 to perform a write operation for storing a write data into the memory device 150. The processor 134 may control the memory device 150 to store the LVD time, measured by the counter 530, corresponding to the write data during the write operation for storing the write data into the memory device 150. The processor 134 may control the memory device 150 to store the LVD time corresponding to the write data as a meta-data corresponding to the write data. For example, during the write operation for storing the first write data into the memory device 150, the processor 134 may control the memory device 150 to store the value of one (1) (i.e., the LVD time) as the meta-data corresponding to the first write data.

And, the processor 134 may periodically update the LVD time corresponding to the write data at a predetermined period. For example, the processor 134 may update the LVD time corresponding to the write data whenever the LVD time is measured by the counter 530.

Figure 6:
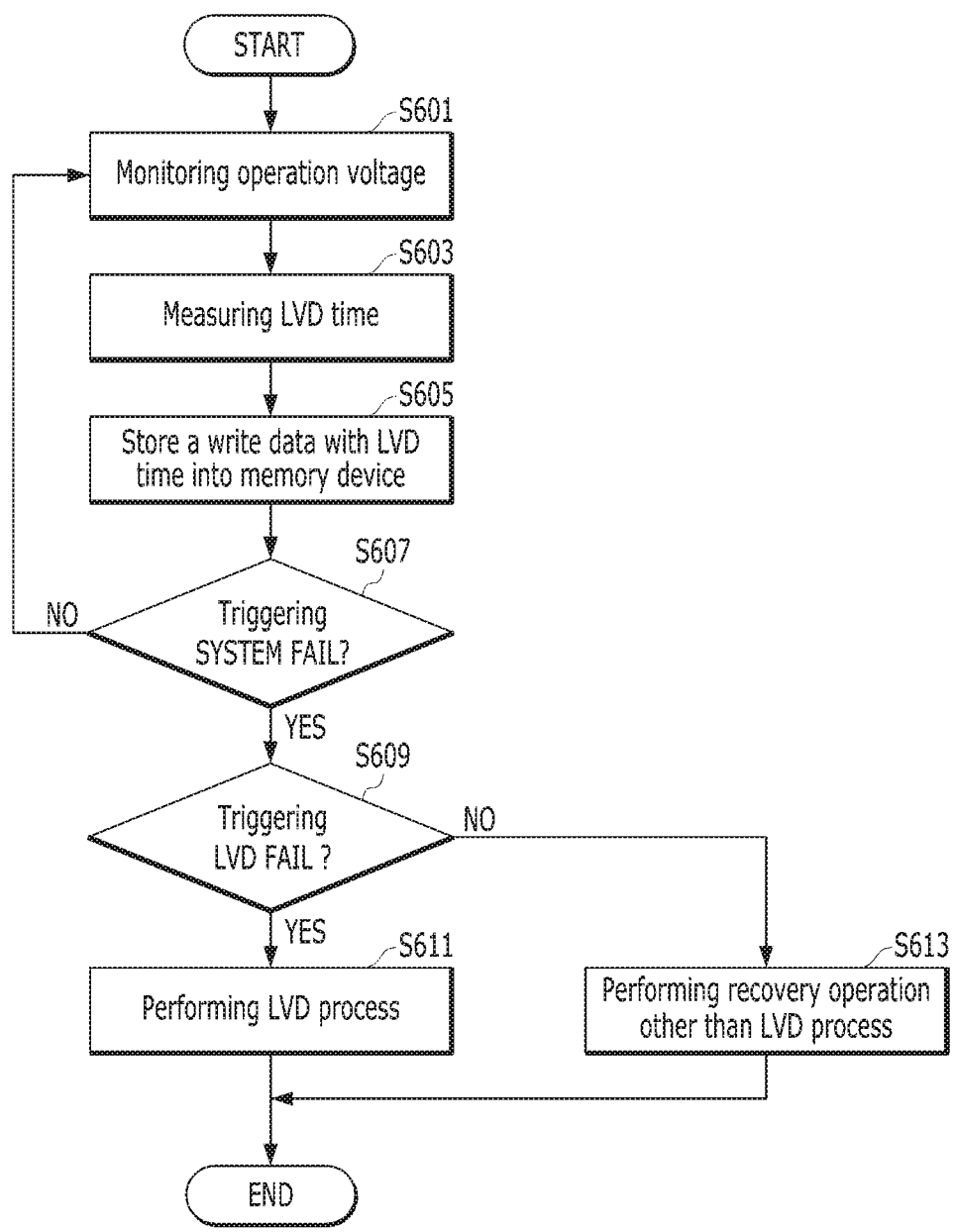
FIG. 6 is a flowchart describing an operation of the controller in accordance with an embodiment of the present disclosure.

FIG. 6 is a flowchart schematically illustrating an operation of the controller 130 in accordance with an embodiment of the invention.

At step S601, the PMU 140 may monitor the operational voltage of the controller 130.

At step S603, the counter 530 may measure the LVD time, in which the operational voltage of the controller 130 stays within the LVD range, when the operational voltage of the controller 130 falls in the LVD range.

At step S605, the processor 134 may control the memory device 150 to store a write data along with the LVD time corresponding to the write data into the memory device 150.

At step S607, the system fail may occur since the operational voltage of the controller 130 falls under the cut-off voltage.

When the system fail does not occur (that is "NO" at step S607), the controller 130 may return to step S601 and repeat steps S601 to S605.

When the system fail occurs (that is, "YES" at step S607), the LVD controller 550 at step S609 may determine whether the LVD fail is the reason for the system fail based on the LVD times respectively corresponding to the data stored in the memory device 150.

When the reason for the system fail is determined to be the LVD fail (that is, "YES" at step S609), the LVD controller 550 at step S611 may perform a debugging operation based on the LVD time. The LVD controller 550 may perform the debugging operation to a target data, which has the LVD time longer than a predetermined threshold time. The operation of performing a debugging operation based on the LVD time may be referred to as the "LVD process".

When the reason for the system fail is not determined to be the LVD fail (that is, "NO" at step S609), the LVD controller 550 at step S613 may perform a recovery operation for the failed system based on the determination that the reason for the system fail is something other than the LVD fail.

In accordance with an embodiment of the invention, the controller 130 may determine whether a reason for the system fail is the LVD fail or not based on the LVD times respectively corresponding to the data stored in the memory device 150. Therefore, the recovery operation may be smoothly performed when the system fail occurs due to the LVD fail, and the operational performance of the controller 130 may be improved.

Hereinafter, data processing systems and electronic apparatuses to which the memory system 110, including the memory device 150 and the controller 130 described with reference to FIGS. 1 to 6, will be described in detail in FIGS. 7 to 15.

FIGS. 7 to 15 are diagrams schematically illustrating application examples of the data processing system of FIGS. 1 to 6 according to various embodiments.

Figure 7:
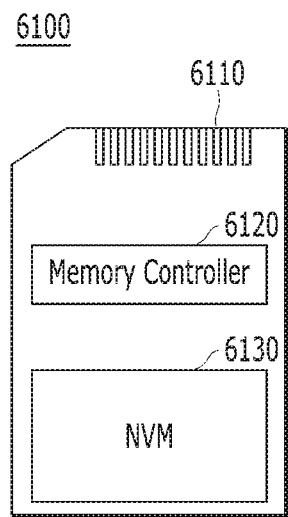
FIGS. 7 to 15 are diagrams schematically illustrating application examples of a data processing system, in accordance with various embodiments of the present disclosure.

FIG. 7 is a diagram schematically illustrating an example of the data processing system including the memory system in accordance with an embodiment. FIG. 7 schematically illustrates a memory card system including the memory system in accordance with an embodiment.

Referring to FIG. 7, the memory card system 6100 may include a memory controller 6120, a memory device 6130 and a connector 6110.

More specifically, the memory controller 6120, configured to access the memory device 6130, may be electrically connected to the memory device 6130. The memory device 6130 may be embodied by a nonvolatile memory. By way of example and not limitation, the memory controller 6120 may be configured to control read, write, erase and background operations onto the memory device 6130. The memory controller 6120 may be configured to provide an interface between the memory device 6130 and a host and/or to use a firmware for controlling the memory device 6130. That is, the memory controller 6120 may correspond to the controller 130 in the memory system 110 described with reference to FIGS. 1 to 6, while the memory device 6130 may correspond to the memory device 150 described with reference to FIGS. 1 to 6.

Thus, the memory controller 6120 may include a RAM, a processing unit, a host interface, a memory interface and an error correction component. The memory controller 130 may further include the elements described in FIG. 1.

The memory controller 6120 may communicate with an external device, for example, the host 102 of FIG. 1 through the connector 6110. By way of example and not limitation, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or specific mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 8:
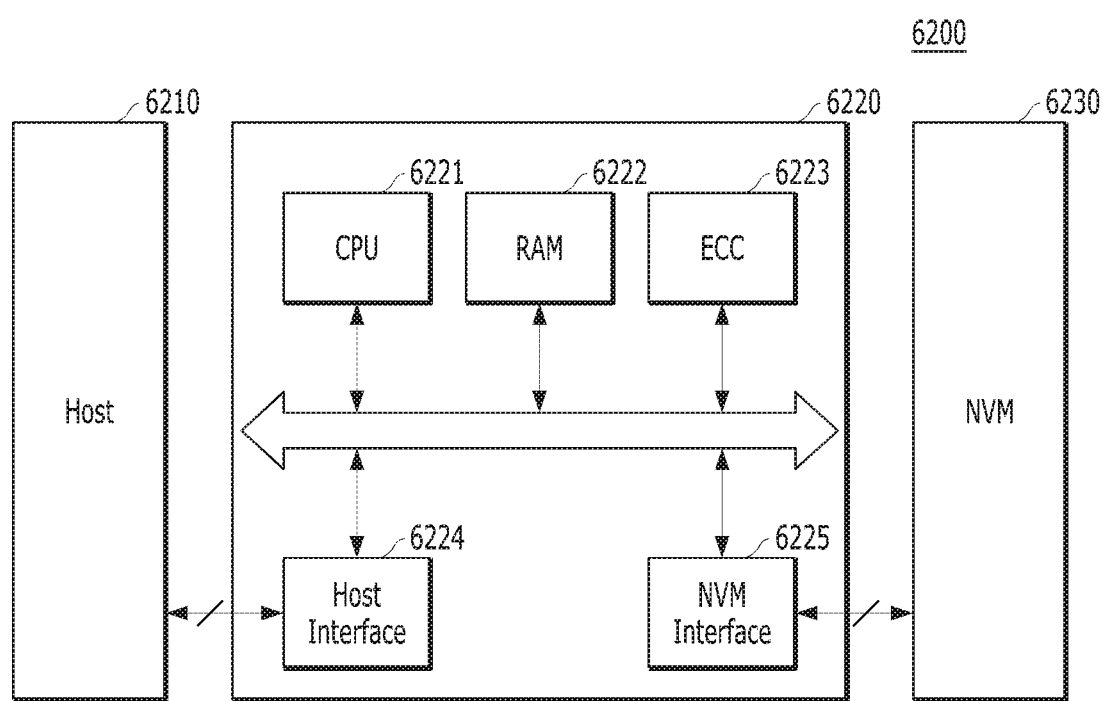

FIG. 8 is a diagram schematically illustrating another example of the data processing system including a memory system, in accordance with an embodiment.

Referring to FIG. 8, the data processing system 6200 may include a memory device 6230 having one or more nonvolatile memories and a memory controller 6220 for controlling the memory device 6230. The data processing system 6200 illustrated in FIG. 8 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 6, while the memory controller 6220 may correspond to the controller 130 in the memory system 110 described in FIGS. 1 to 6.

The memory controller 6220 may control a read, write, or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fall bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from, the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may achieve a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system in accordance with an embodiment may be applied to wired/wireless electronic devices, particularly a mobile electronic device.

Figure 9:
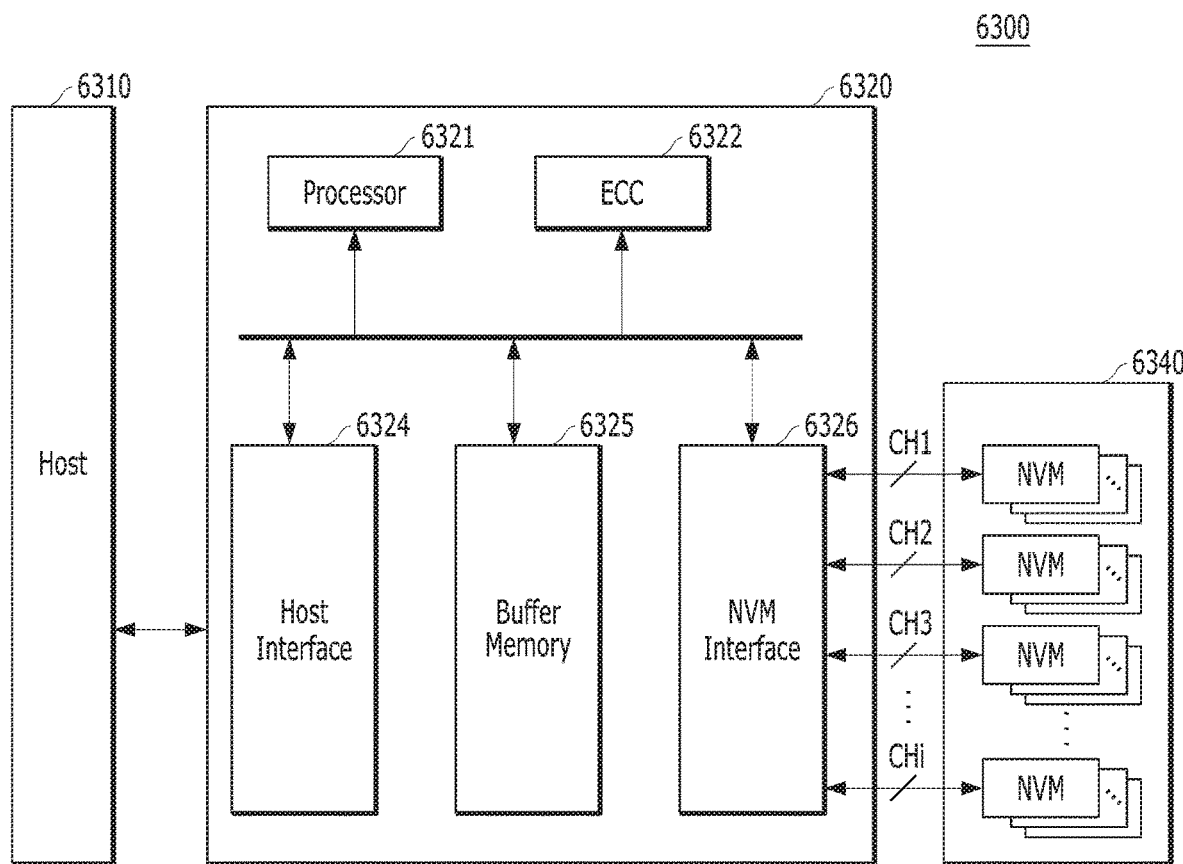

FIG. 9 is a diagram schematically illustrating another example of the data processing system including the memory system in accordance with an embodiment. FIG. 9 schematically illustrates an SSD to which the memory system in accordance with an embodiment is applied.

Referring to FIG. 9, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. The buffer memory 6325 may temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. For the purpose of description, FIG. 9 illustrates that the buffer memory 6325 exists in the controller 6320, but the buffer memory 6325 may be located or arranged outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, to provide data read from the selected SSDs 6300 to the host 6310.

Figure 10:
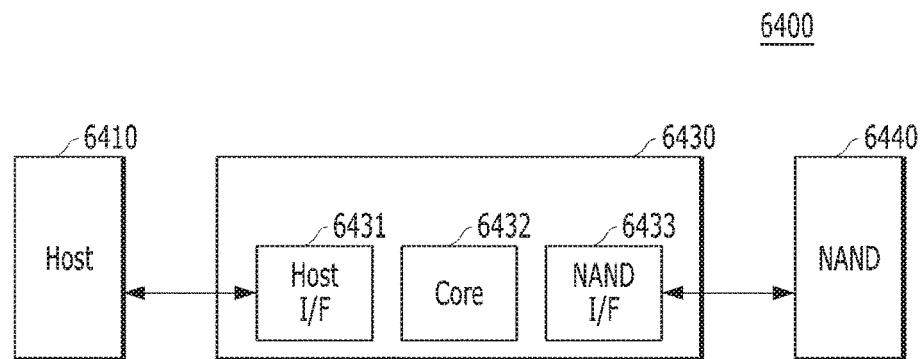

FIG. 10 is a diagram schematically illustrating another example of the data processing system including the memory system in accordance with an embodiment. FIG. 10 schematically illustrates an embedded Multi-Media Card (eMMC) to which the memory system in accordance with an embodiment is applied.

Referring to FIG. 10, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400. The host interface 6431 may provide an interface function between the controller 6430 and the host 6410. The NAND interface 6433 may provide an interface function between the memory device 6440 and the controller 6430. By way of example and not limitation, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 11 to 14 are diagrams schematically illustrating other examples of the data processing system including the memory system in accordance with an embodiment. FIGS. 11 to 14 schematically illustrate UFS (Universal Flash Storage) systems to which the memory system in accordance with an embodiment is applied.

Referring to FIGS. 11 to 14, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 8 to 10. The UFS cards 6530, 6630, 6730, 6830 may be embodied in the form of the memory card system 6100 described with reference to FIG. 7.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 11:
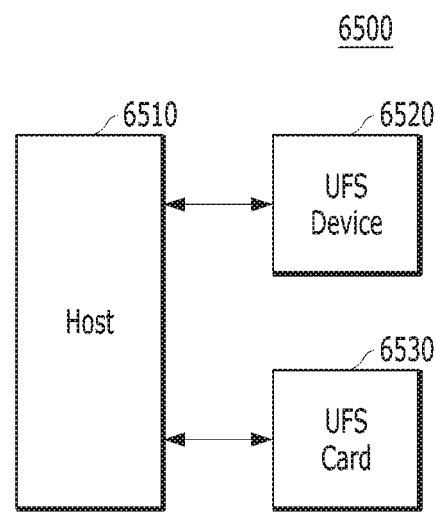

In the UFS system 6500 illustrated in FIG. 11, each of the host 6510, the UFS device 6520 and the UFS card 6530 may include UniPro. The host 6510 may perform a switching operation to communicate with at least one of the UFS device 6520 and the UFS card 6530. The host 6510 may communicate with the UFS device 6520 or the UFS card 6530 through link layer switching, e.g., L3 switching at the UniPro. In this case, the UFS device 6520 and the UFS card 6530 may communicate with each other through a link layer switching at the UniPro of the host 6510. In an example, the configuration in which one UFS device 6520 and one UFS card 6530 are connected to the host 6510 has been exemplified for convenience of description. However, a plurality of UFS devices and UFS cards may be connected in parallel or in the form of a star to the host 6410 (herein, the form of a star means an arrangement that a single device is coupled with plural other devices or cards for centralized control). A plurality of UFS cards may be connected in parallel or in the form of a star to the UFS device 6520 or connected in series or in the form of a chain to the UFS device 6520.

Figure 12:
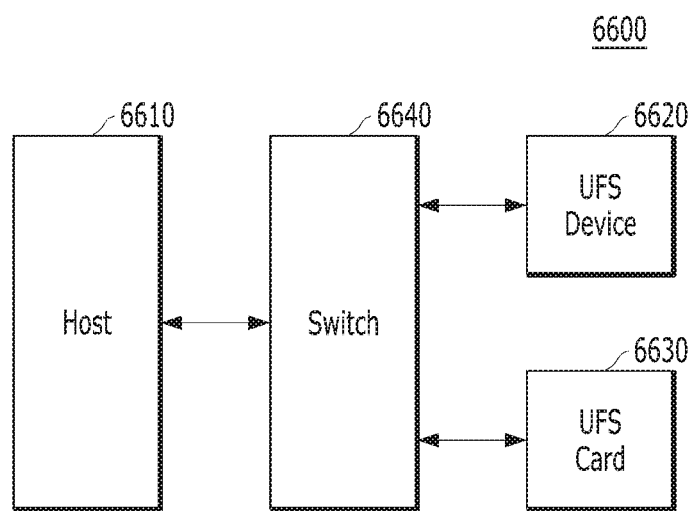

In the UFS system 6600 illustrated in FIG. 12, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an example, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640. A plurality of UFS cards may be connected in series or in the form of a chain to the UFS device 6620.

Figure 13:
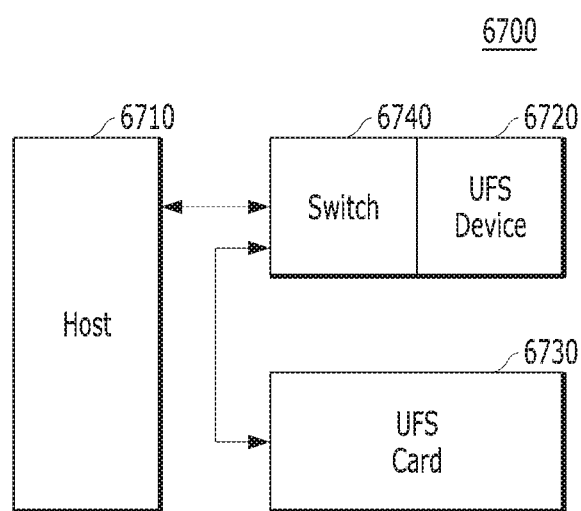

In the UFS system 6700 illustrated in FIG. 13, each of the host 6710, the UFS device 6720 and the UFS card 6730 may include UniPro, and the host 6710 may communicate with the UFS device 6720 or the UFS card 6730 through a switching module 6740 performing a switching operation, for example, the switching module 6740 which performs link layer switching at the UniPro, for example, L3 switching. In this case, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an example, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 14:
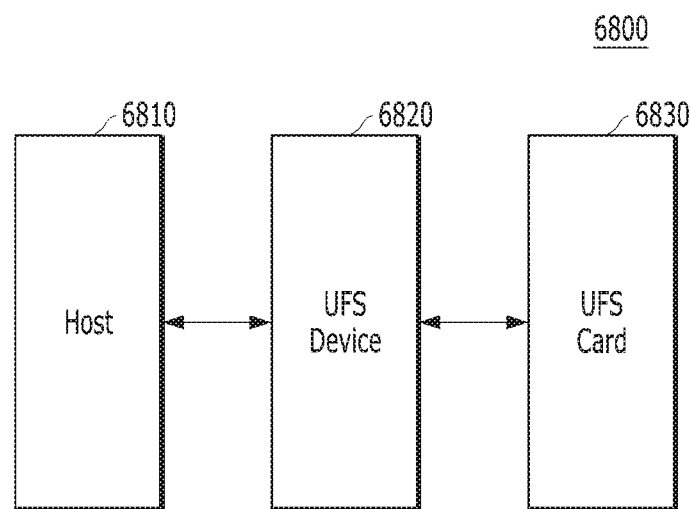

In the UFS system 6800 illustrated in FIG. 14, each of the host 6810, the UFS device 6820 and the UFS card 6830 may include M-PHY and UniPro. The UFS device 6820 may perform a switching operation to communicate with the host 6810 and the UFS card 6830. The UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. Here, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 15:
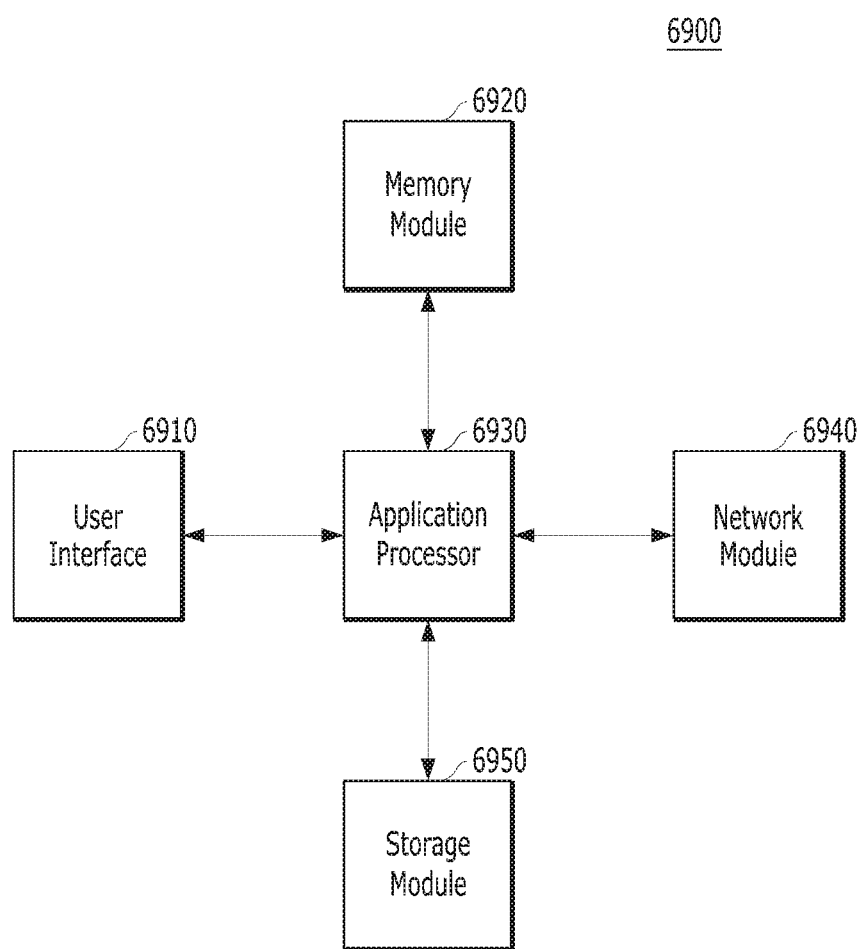

FIG. 15 is a diagram schematically illustrating another example of the data processing system including the memory system in accordance with an embodiment. FIG. 15 is a diagram schematically illustrating a user system to which the memory system in accordance with an embodiment is applied.

Referring to FIG. 15, the user system 6900 may include an application processor 6930, a memory module 6920, a network module 6940, a storage module 6950 and a user interface 6910.

More specifically, the application processor 6930 may control or drive components included in the user system 6900, for example, an OS. The application processor 6930 may include controllers, Interfaces and a graphic engine which can control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. By way of example and not limitation, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or specific mobile electronic devices. Therefore, the memory system and the data processing system, in accordance with an embodiment of the present invention, can be applicable to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied in a nonvolatile semiconductor memory device such as a phase-change RAM (PRAM), a magnetic RAM (MRAM), a resistive RAM (ReRAM), a NAND flash, NOR flash and 3D NAND flash. The storage module 6950 may be provided with a removable storage medium such as a memory card or external drive of the user system 6900. The storage module 6950 may correspond to the memory system 110 described with reference to FIG. 1. Furthermore, the storage module 6950 may be embodied in an SSD, eMMC and UFS as described above with reference to FIGS. 9 to 14.

The user interface 6910 may include interfaces for inputting data or commands to the application processor 6930 or outputting data to an external device. By way of example and not limitation, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the invention has been described with respect to specific embodiments, it will be apparent to those skilled in the art that various changes and modifications may be made without departing from the spirit and scope of the invention as determined in the following claims.

What is claimed is:

1. A controller comprising:
    a power management unit suitable for providing and monitoring an operational voltage;
    a counter suitable for measuring a Low Voltage Detection (LVD) time, in which the operational voltage stays within an LVD range;
    a processor suitable for controlling a memory device to store write data with the LVD time corresponding to the write data stored into the memory device; and
    an LVD controller suitable for determining, during a recovery operation after occurrence of an LVD fail, a reason for a system fail as the LVD fail based on the LVD times and suitable for performing a debugging operation on a target data, which has the LVD time longer than a predetermined threshold time.

2. The controller of claim 1, wherein the LVD controller performs the debugging operation on the target data based on system information and electrical characteristic information.

3. The controller of claim 1, wherein the processor controls the memory device to store the LVD time corresponding to each of the write data as a meta-data corresponding to each of the write data into the memory device.

4. The controller of claim 1, wherein the processor periodically updates the LVD time corresponding to the write data at a predetermined period.

5. The controller of claim 1, wherein the LVD controller determines the reason for the system fail as the LVD fail based on the LVD times starting from a most recently accessed page.

6. The controller of claim 1, wherein the LVD range is between a cut-off voltage and an LVD threshold voltage.

7. An operating method of a controller, the method comprising:
    monitoring, by a power management unit, an operational voltage;
    measuring, by a counter, a Low Voltage Detection (LVD) time, in which the operational voltage stays within an LVD range;
    controlling, by a processor, a memory device to store write data with the LVD time corresponding to the write data stored into the memory device;
    determining, by a LVD controller, a reason for a system fail as a LVD fail based on the LVD times during a recovery operation after occurrence of the LVD fail; and
    performing, by the LVD controller, a debugging operation on a target data, which has the LVD time longer than a predetermined threshold time.

8. The method of claim 7, wherein the performing of the debugging operation is performed based on system information and electrical characteristic information.

9. The method of claim 7, wherein the controlling of the memory device is performed by controlling the memory device to store the LVD time corresponding to each of the write data as a meta-data corresponding to each of the write data into the memory device.

10. The method of claim 7, further comprising periodically updating the LVD time corresponding to the write data at a predetermined period.

11. The method of claim 7, wherein the determining of the reason for the system fail as the LVD fail is performed by determining the reason of the system fail as the LVD fail based on the LVD times starting from a most recently accessed page.

12. The method of claim 7, wherein the LVD range is between a cut-off voltage and an LVD threshold voltage.

13. A memory system comprising:
a memory device; and
a controller suitable for controlling the memory device, wherein the controller includes:
a power management unit suitable for providing and monitoring an operational voltage;
a counter suitable for measuring a Low Voltage Detection (LVD) time, in which the operational voltage stays within an LVD range;
a processor suitable for controlling the memory device to store write data with the LVD time corresponding to the write data stored into the memory device; and
an LVD controller suitable for determining, during a recovery operation after occurrence of an LVD fail, a reason for a system fail as the LVD fail based on the LVD times and suitable for performing a debugging operation on a target data, which has the LVD time longer than a predetermined threshold time.

14. The memory system of claim 13, wherein the LVD controller performs the debugging operation on the target data based on system information and electrical characteristic information.

15. The memory system of claim 13, wherein the processor controls the memory device to store the LVD time corresponding to each of the write data as a meta-data corresponding to each of the write data into the memory device.

16. The memory system of claim 13, wherein the processor periodically updates the LVD time corresponding to the write data at a predetermined period.

17. The memory system of claim 13, wherein the LVD controller determines the reason for the system fail as the LVD fail based on the LVD times starting from a most recently accessed page.

18. The memory system of claim 13, wherein the LVD range is between a cut-off voltage and an LVD threshold voltage.

19. A memory system comprising:
a memory device suitable for storing data; and
a controller suitable for using an operational voltage to program the data in the memory device,
wherein the controller is suitable for measuring a Low Voltage Detection (LVD) time that the operational voltage is within an LVD range and storing the data with the LVD time associated with the data in the memory device,
wherein the controller performs at least one of a first operation of determining a system fail based on the LVD times during a recovery operation and a second operation of performing a debugging operation to a target data associated with the LVD time longer than a threshold time.

* * * * *